(12) United States Patent
Cowin

(10) Patent No.: US 7,610,715 B2
(45) Date of Patent: Nov. 3, 2009

(54) REVERSIBLY DISENGAGING SLIDABLE STRIKE INDICATOR, POSITIONING SYSTEM, AND METHOD OF USING SAME

(75) Inventor: Clifton J. Cowin, Woodinville, WA (US)

(73) Assignee: Dream Waters, Inc., Seattle, WA (US)

( * ) Notice: Subject to any disclaimer, the term of this patent is extended or adjusted under 35 U.S.C. 154(b) by 0 days.

(21) Appl. No.: 11/165,660

(22) Filed: Jun. 24, 2005

(65) Prior Publication Data

US 2006/0288632 A1 Dec. 28, 2006

(51) Int. Cl.
*A01K 93/00* (2006.01)
*A01K 93/02* (2006.01)

(52) U.S. Cl. .................... 43/44.91; 43/44.9; 43/44.87

(58) Field of Classification Search ............... 43/44.91, 43/92, 95, 44.87, 44.88, 44.9
See application file for complete search history.

(56) References Cited

U.S. PATENT DOCUMENTS

| | | | | |
|---|---|---|---|---|
| 2,393,070 A | * | 1/1946 | Saloun | 43/44.91 |
| 3,124,892 A | * | 3/1964 | O'Brien | 43/42 |
| 3,800,459 A | * | 4/1974 | Fleischaker | 43/44.9 |
| 4,235,037 A | * | 11/1980 | Sivertsen | 43/44.91 |
| 4,359,836 A | * | 11/1982 | Yuji | 43/44.9 |
| 4,644,681 A | | 2/1987 | Hutson | |
| 4,696,125 A | * | 9/1987 | Rayburn | 43/43.14 |
| 4,845,884 A | * | 7/1989 | Pacitti | 43/44.88 |
| 4,977,700 A | * | 12/1990 | Perlman et al. | 43/57.2 |
| 4,986,023 A | * | 1/1991 | Bucholz | 43/44.87 |
| 5,031,351 A | * | 7/1991 | Rogel | 43/44.9 |
| 5,161,324 A | * | 11/1992 | Dorsey | 43/44.9 |
| 5,456,041 A | * | 10/1995 | Schoeberlein | 43/44.91 |
| 6,073,386 A | * | 6/2000 | Firmin | 43/44.87 |

* cited by examiner

*Primary Examiner*—David J Parsley
(74) *Attorney, Agent, or Firm*—Barry L. Davison, J.D.; Davis Wright Tremaine LLP

(57) ABSTRACT

Particular aspects provide novel strike indicators attachable to fishing lines, that are reversibly disengagable therefrom and thereafter slidably along the line. Particular embodiments comprise: a buoyant main body having an axial channel with corresponding end surface openings; an retention member seat (e.g., groove, ridge, etc.) running around the main body surface; and at least one line retention member receivable and retainable by the seat, and operative with the seat to retain a line passing therebetween at two points. The retention member is displaceable from the seat by sufficient line tension, thereby disengaging the slidable strike indicator. Particular embodiments comprise two strike indicator stop members attachable at user-selectable line positions, and operative to delimit a slidable range of a disengaged slidable strike indicator. Novel methods for fishing, with a slidable reversibly detachable indicator, at a depth greater than the length of a fishing rod are presented.

34 Claims, 9 Drawing Sheets

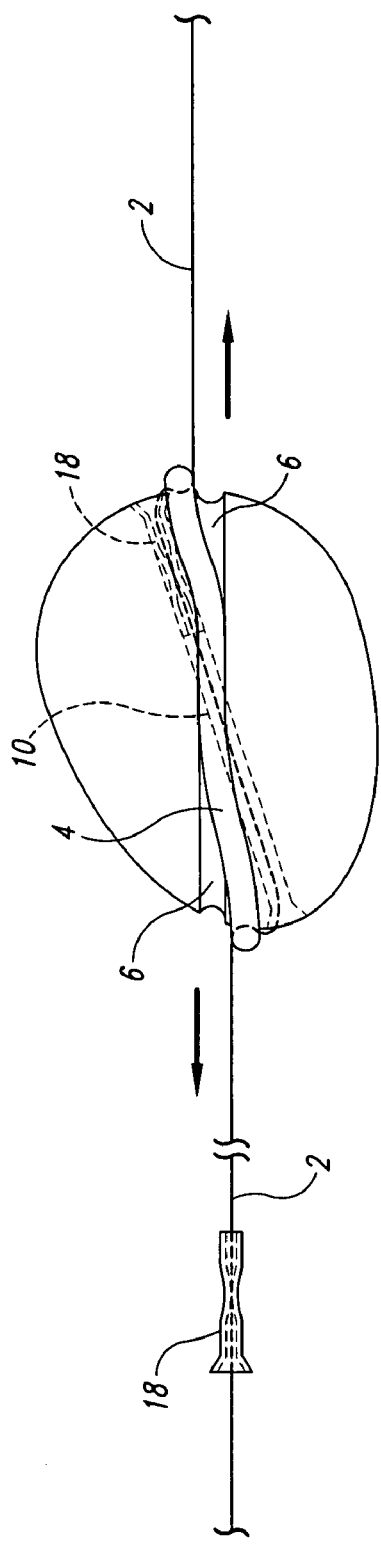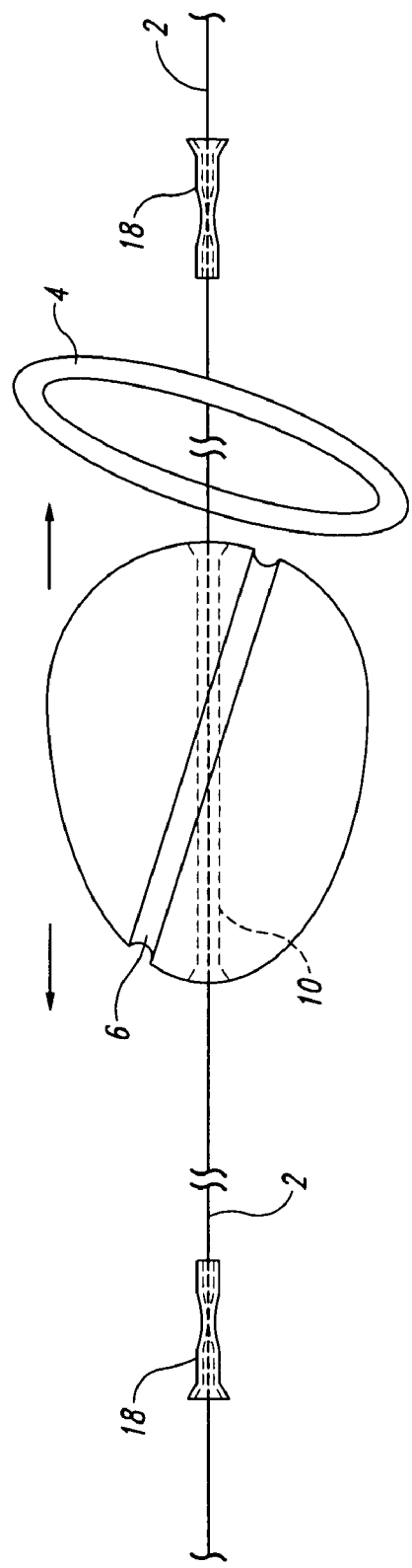
Fig. 5A
Fig. 5B

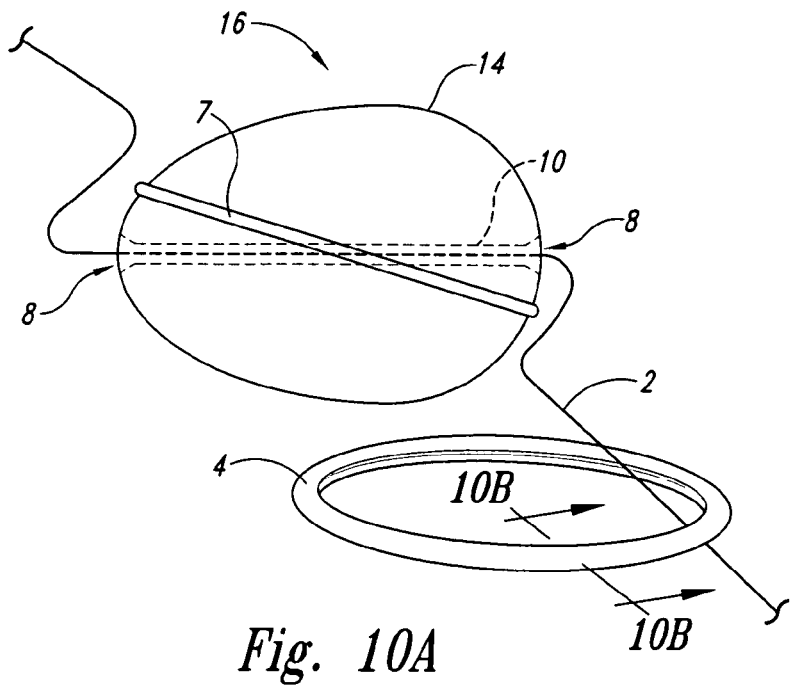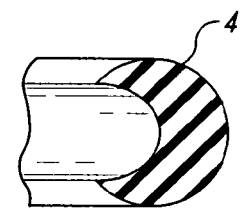
Fig. 10A  Fig. 10B
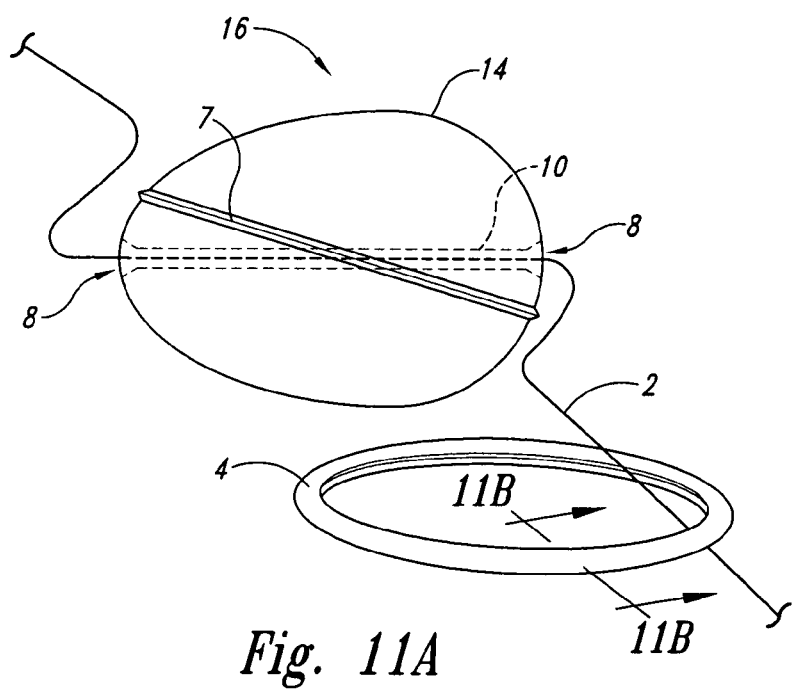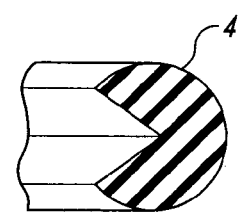
Fig. 11A  Fig. 11B

REVERSIBLY DISENGAGING SLIDABLE STRIKE INDICATOR, POSITIONING SYSTEM, AND METHOD OF USING SAME

FIELD OF THE INVENTION

Aspects of the present invention relate generally to strike indicators for fishing lines and methods for using same, and more particularly to novel disengaging strike indicators that disengage by novel means upon application of sufficient tension to the attendant line (e.g., strike-activated disengagement), and are thereafter slidable along the attendant fishing line between, in particular aspects, two settable positions (e.g., between hook-distal and hook proximal disengagement positions or strike indicator stop position members).

BACKGROUND

Strike indicators for fishing, including fly fishing and non-fly fishing, are known in the art. Typically, strike indicators are comprised of a buoyant material, and are large enough, and/or of suitable character (e.g., color, fluorescence, etc.), to be viewable at a operational distance by a fisherperson monitoring the indicator. Buoyant strike indicators, in operation, are designed to attachable to a fishing line, and thereby serve to suspend the line, with one or more attached fishing hooks or members at the end thereof, at a distance under the water corresponding to the length of line between the hook member and the strike indicator attachment point. When a fish strikes the suspended hook(s), the strike indicator is correspondingly displaced at the surface, thereby signaling the fisherperson to respond, typically by 'setting' the hook into the fish using appropriate rod/line action. Therefore, such strike indicators function as a strike indicator, and also may, in particular instances, serve as a fishing depth positioning means.

To be operationally viewable, strike indicators are typically larger than the line 'guides' of a fishing rod (particularly the guides of fly rods, which are relatively small) and are typically attached at a fixed position along the fishing line. Therefore, without fisherperson intervention and removal of the attached indicator, the attached line is only retrievable through the guides of a fishing rod to the point of attachment of the strike indicator. For some fishing situations, this line retrieval limitation may not present a problem, because the length of line from the strike indicator attachment point to the hook(s) is less than or roughly equal to the rod length, enabling sufficient retrieval of line so that a hooked fish can be maneuvered to a position close enough for effective capture by the fisherperson. However, the line retrieval problem caused by prior art strike indicators is severe in many situations, and particularly in low-profile constrained contexts (e.g., boat or float-tube fishing), involving fishing with a hook suspended on a line from a strike indicator at depths that significantly exceed that of the rod length. Specifically, where the fishing depth exceeds the rod length, the line is not retrievable beyond the strike indicator attachment point (the strike indicator cannot pass through the line guides), and the distance from the rod tip to a hooked fish may be much greater than the rod length, making capture of the fish difficult if not impossible in low-profile and/or constrained fishing contexts. This substantial limitation not only reduces the number of fish catchable within a given time period because of loss of fish, but often results in harm to hooked fish because of the non-optimal capture conditions (hooked fish too far from the rod tip). While strike indicators that can be repositioned are known in the art, such repositioning is typically done by the fisherperson, and, practically speaking, cannot be effectively done once a fish has been hooked and the fisherperson and the fish are operationally engaged in an excited state.

One known approach to providing a strike indicator that is more easily slidable is the adjustable Frog Hair™ EZ-ON indicator (Gamma Technologies, Pittsburgh, Pa.), designed to be manually adjustable by sliding along a length of 'tippet' material. This approach is based on inserting line 'tippet' consecutively through two elastic positioning retainers that are retained at and within opposite ends of the axial bore of a buoyant indicator body (see FIG. 9). The elastic retainers enable the indicator to be forcibly repositioned along the leader, while providing sufficient gripping pressure against the leader to maintain its position. This system, however, has substantial drawbacks, because, due to the nature of the elastic positioning retainers, they become worn and cannot be reused, and the indicator cannot be reinstalled after removal from the leader (at least without obtaining new retainers and threading tippet therethrough using a special wire-loop threading tool). Additionally, while being slidably adjustable, these indicators are not quick release, and such adjustment is by means of significant force applied by the fisherperson, and does not enable, for example, practical repositioning of the indicator during a fish 'hook-up' when fish and fisherperson are actively engaged. Moreover, the elastic positioning retainers cannot pass over knots (e.g., 'blood' knots) that are typically found in most leaders being used, and even if they could their gripping character would be degraded, thereby rendering the indicator effectively useless in a short time.

A known approach to providing a releasable and slidable strike indicator is a quick release indicator (Waters West, Port Angeles, Wash.) designed to release in response to a fish 'hook-up.' This approach is based on inserting line 'tippet' consecutively through the axial bores of an foam-based (Styrofoam™-based) indicator and a black plastic stopper, forming a tippet loop in the tippet at a position between the indicator and the stopper, tucking a portion of the tippet loop into a stopper-receiving slot of the indicator, and inserting the stopper into the stopper receiving slot, thereby wedging, by pressure, the tucked tippet portion between the wall of the receiving slot and the stopper to reversibly attach the indicator stopper combination to the line tippet (see FIGS. 8A and 8B). With a fish 'hook-up,' the tension in the line increases and frees the tucked loop, thereafter allowing the indicator and stopper to freely slide along the fishing line. However, there are substantial drawbacks to this solution, including the fact that it is difficult, if not impossible, upon repeated use, to consistently wedge the tippet loop with a reproducible amount of force to provide the right amount of tension for triggering release on 'hook-up.' This is because, even if one were able to insert the stopper with consistent force into the receiving slot of the indicator, the amount of the tippet loop thereby wedge varies from event to event, and even more problematic, the amount of force required to effectively wedge the loop is enough to cause the loop material to deteriorate (e.g., deform, gouge, etc.) the wall of the receiving slot, giving rise to inconsistent and progressively deteriorating performance of the indicator system. Additionally, there is no provision for re-attaching the indicator at a set line position from one 'hook-up' to another to allow for reproducibly fishing at a set depth, and there is no provision (except the hook and the lines guides of the rod) to limit the slidable range. Moreover, because of the necessity to wedge enough stopper and tippet loop surface areas against the receiving slot wall to provide sufficient resistance to preclude inadvertent release events, the stopper and receiving slot must be of a sufficient size, thereby defining a minimum size (e.g., no such indicators are marketed that are smaller than about ½ inches to about ⅜ inches in diameter). Furthermore, the high profile of the stopper and the asymmetric design of the indicator/stopper combination are less than desirable in terms of line-fouling characteristics.

Therefore, there is a pronounced need in the art for strike indicators that are more easily and consistently disengagable from an attendant line or leader, and that are substantially more reusable. There is a pronounced need in the art for strike indicators that are disengagable by means other than direct contact or mediation by a fisherperson. There is a pronounced need in the art for strike indicators that are more easily and consistently disengagable, and thereafter readily slidable along a fishing line. There is a pronounced need in the art for a strike indicator system that is slidable along a fishing line within a user-settable defined range along a fishing line and/or leader. There is a pronounced need in the art for a strike indicator system that enables more effective and reproducible fishing with a strike indicator at depths significantly greater than the rod length.

SUMMARY OF THE INVENTION

Particular aspects of the present invention provide novel strike indicators that are attachable to fishing lines (e.g., fly fishing lines and/or leaders), and are disengagable therefrom, by novel reversibly retaining means, upon application of sufficient tension to the line (e.g., strike-activated disengagement). In additional aspects, the strike indicators are reversibly disengagable, and thereby slidably adjustable and positionable along a fishing line, including repositionable within a range defined by user-selectable stop position members.

In particular aspects, the inventive disengagable strike indicators comprise: a buoyant main body portion having an exterior surface, first and second main body ends, and an axial channel therebetween, with corresponding first and second main body end surface openings, wherein the channel is sufficient to accommodate slidable passage of a fishing line therethrough. There is an exterior line retaining member seat (e.g., a groove within the main body having sides and a bottom, or a ridge protruding from the main body surface having sides and a top), said retaining member seat running around the exterior surface of the main body. In preferred embodiments, the groove or ridge encompasses the channel axis such that the first and second end surface openings are disposed on opposite sides of the groove or ridge. In alternate embodiments, the retaining member seat (e.g., groove or ridge), while running around the exterior surface of the main body, does not thereby encompass the channel axis, such that the first and second end surface openings are disposed on the same side of the groove or ridge instead of on opposite sides as in preferred embodiments. A resilient annular line retention member having a suitable shape and size so as to be reversibly receivable and retainable by the retaining member seat (e.g., receivable within the groove, or upon the ridge), is operative with the seat to retain a fishing line passing therebetween at two points. Upon application of sufficient line tension, the resilient member is displaced from the groove or ridge, thereby disengaging the strike indicator and thereafter allowing sliding of the strike indicator main body axial channel along the fishing line.

Additional aspects provide a novel strike indicator system for fishing lines (e.g., fly fishing lines and/or leaders), the system comprising: a disengagable fishing line strike indicator that is, in operation, disengagable from and thereafter slidable along a fishing line and/or leader; and at least one strike indicator stop member attachable to a fishing line or leader, and sufficient, in operation, to limit slidable travel of the disengaged strike indicator. In particular embodiments, the system comprises two attachable strike indicator stop members, suitable, in operation of the system, to delimit a slidable range of a disengaged slidable strike indicator along a fishing line and/or leader. In additional embodiments, the system further comprises a fishing line for attachment of the disengagable strike indicator and at least one strike indicator stop member.

Further aspects provide a method of fishing (for any type of water and fishing; eg., salt water, fresh water, rivers, lakes, trout, salmon, bass, bluefish, etc.) with a strike indicator system, comprising: a fishing line and/or leader; a buoyant disengagable fishing line strike indicator that is reversibly attachable to, disengagable from and thereafter slidable along a fishing line and/or leader; and at least one strike indicator stop member attachable to a user-selectable position along the fishing line, and sufficient, in operation, to limit slidable travel of the disengaged strike indicator along the fishing line. In particular embodiments, the method is practiced with a system that comprises first and second attachable strike indicator stop members attached at different user-selected positions along the fishing line and/or leader, and suitable, in operation of the system, to delimit a slidable range of the disengaged slidable strike indicator along the fishing line. In particular aspects, the inventive disengagable strike indicator is attached to the line in engagement with the first line stop member attached at a first fixed line position, and upon disengagement, the disengaged strike indicator is thereafter slidable along the fishing line between the first and second line stop members, enabling, for example, practical and effective fishing with a strike indicator at depths greater than the rod length.

BRIEF DESCRIPTION OF THE DRAWINGS

FIGS. 5A and 5B show, according to particular aspects, a side view of an exemplary disengagable strike indicator system embodiment having a line stop member engaged therein (FIG. 5A) to attach the indicator at a user-selected position, and further shows (FIG. 5B) how the annular line retention member is displaceable from the exterior groove of the main body upon application of sufficient line tension (indicated the pair of opposing arrows), which disengages the strike indicators and thereafter allows sliding of the indicator along the line (e.g., between a pair of stop members attached to the line at user-selected positions). Typically, in such embodiments, the resilient retention member is displaced on the side of the larger (or otherwise asymmetric) aspect of a (e.g., ovoid) main body.

FIGS. 10A and 10B shows, according to particular aspects, another exemplary embodiment similar to that of FIGS. 1 and 2, but having a line retaining member seat that is in the form of a rounded ridge protruding from the main body surface, instead of a groove within the main body. The line retaining member has a groove on its inner surface that cooperatively conforms to the rounded ridge retaining member seat, and is operative with the ridge seat to retain a fishing line passing therebetween at two points.

FIGS. 11A and 11B shows, according to particular aspects, another exemplary embodiment similar to that of FIGS. 1 and 2, but having a line retaining member seat that is in the form of an inverted "V"-shaped ridge protruding from the main body surface, instead of a groove within the main body. The line retaining member has a groove on its inner surface that cooperatively conforms to the "V"-shaped ridge retaining member seat, and is operative with the ridge seat to retain a fishing line passing therebetween at two points.

DETAILED DESCRIPTION OF THE INVENTION

Particular aspects of the present invention provide novel disengagable strike indicators that are attachable, by novel means, to a fishing line at a user-selected position, and, upon disengagement therefrom, are slidable along the fishing line.

Additional aspects provide novel disengagable strike indicator systems that comprise, in addition to a disengagable strike indicator, at least one strike indicator stop member that is attachable at a user-selected fixed position along a fishing line, and is also engagable with the inventive strike indicator main bodies to limit slidable travel of a disengaged strike indicator along the fishing line.

Further aspects provide novel methods for fishing, comprising fishing with an inventive disengagable strike indicator, or the inventive strike indicator system.

Yet further aspects provide novel methods for effective and efficient fishing with a strike indicator at a depth greater than the length of a fishing rod, comprising fishing with an inventive disengagable strike indicator, or strike indicator system. The methods facilitate efficient capture of a hooked fish, increase fishing efficiency and the overall fishing experience, and decrease attendant injury to captured fish.

The following discussion describes in detail particular aspects and embodiments of the invention and several variations thereof. This discussion should not be construed as limiting the invention to the particular embodiments or to those particular variations. Practitioners skilled in the art will recognize numerous other embodiments and variations, as well, that are encompassed within the scope of the claim subject matter.

Figure 12A:
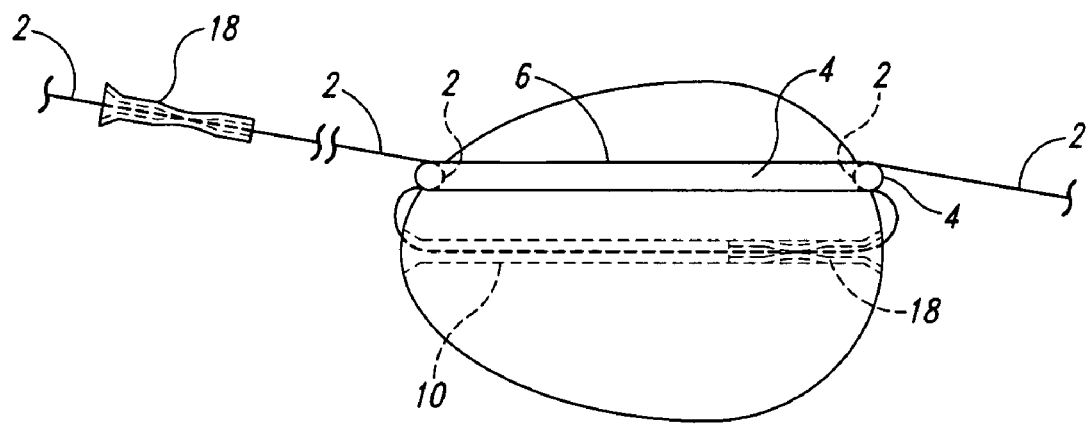
FIGS. 12A and 12B show, according to additional aspects, two alternate exemplary embodiments, which are similar to those shown in FIGS. 2 and 4, except the retaining member seat (e.g., groove or ridge), while running around the exterior surface of the main body, does not thereby encompass the channel axis, such that the first and second end surface openings are disposed on the same side of the retaining member seat (e.g., groove or ridge) instead of on opposite sides.
Figure 12B:
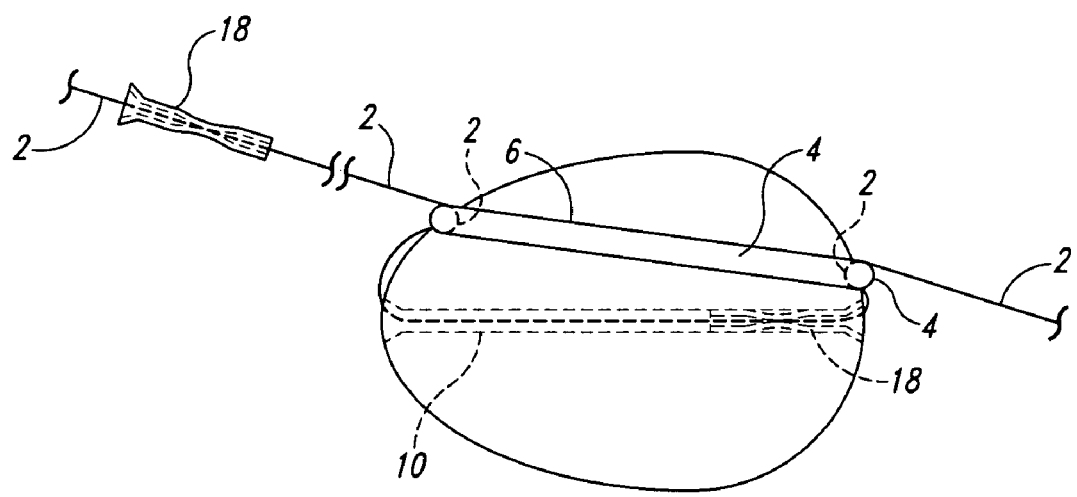

Disengagable Strike Indicator:

With reference to FIGS. 1, 2, 5A, 5B, 6A-6G, 10A, 10B, 11A, 11B, 12A and 12B, particular embodiments of the present invention are directed to a disengagable strike indicator 28 for a fishing line, comprising a buoyant main body portion 16 having an exterior surface 14, first and second main body ends, and an axial channel 10 therebetween, with corresponding first and second main body end surface openings 8, the channel 10 sufficient to accommodate slidable passage of a fishing line 2 therethrough. The main body 16 additionally comprises an exterior line retaining member seat (e.g., groove, raised ridge, etc.), which in this embodiment is a groove 6, having sides and a bottom, within and around the exterior surface 14, wherein, in this embodiment, the groove 6 encompasses the channel 10 axis such that the first and second end surface openings 8 are disposed on opposite sides of the groove 6. In alternate exemplary embodiments (see FIGS. 10A and 11A), the line retaining member seat comprises an elevation or ridge 7 (e.g., rounded or inverted "V"-shaped) protruding, at least to some extent, from the main body surface 14. In particular less preferred alternate embodiments (see FIGS. 12A and 12B), the line retaining member seat (e.g., groove, ridge, etc.) is disposed around the exterior surface 14, but does not encompass the channel 10 axis, such that the first and second end surface openings 8 are disposed on the same side of the retaining member seat (e.g., groove 6). Embodiments as shown in FIGS. 12A and 12B are less preferred, because, inter alia, the retaining member 4 is not retained on the line after disengagement (see below). The disengagable strike indicator 28 of FIGS. 1 and 2 further comprises a resilient (e.g.: elastic; pliant; supple; flexible, etc.) line retention member 4 having a suitable shape (e.g., annular) and size so as to be reversibly receivable and retainable by the line retaining member seat (e.g., within the groove 6, or upon the ridge 7 (see FIGS. 10A, 10B, 11A and 11B), and operative with the seat to sufficiently retain a fishing line 2 passing therebetween at two points. In particular embodiments of the exemplary strike indicator 28 (see FIGS. 1 and 2), the main body channel 10 axis intersects a plane defined by the retention member seat (e.g., the exterior groove 6) at an acute angle (i.e., less than ninety degrees). Preferably, the angle between the main body channel 10 axis at one or the other main body end 8, and a plane defined by the retention member seat (e.g., the exterior groove 6) is selected from the group consisting of: less than about thirty degrees and greater than about 2 degrees; less than about twenty degrees and greater than about five degrees; and less than about fifteen degrees and greater than about seven degrees. Preferably, the angle between the main body channel 10 axis at one or the other main body end 8, and a plane defined by the retention member seat (e.g., groove 6) is less than about fifteen degrees and greater than about seven degrees. In particular embodiments, the distance, in opposite directions, from the first and second main body end surface openings 8 to the retention member seat (e.g., groove 6) is the same or substantially the same. In alternate less preferred embodiments (see FIGS. 12A and 12B), the main body channel 10 axis does not intersect a plane defined by the retention member seat (e.g., the exterior groove 6 or ridge 7, etc.). In particular embodiments, the resilient annular line retention member 4 protrudes, at least to some extent, beyond exterior surface 14. In embodiments where the resilient line retention member 4 is receivable into a groove, the retention member 4 is preferably receivable into the groove 6 to a distance not greater than about one-half the radial width of the resilient member 4, so that at least about half of the member 4 protrudes above the surface 14. However, according to aspects of the present invention, the extent of receipt of the retention member 4 into the groove 6 may vary, so long as the retention member 4 is sufficiently and reversibly retainable. In embodiments where the resilient line retention member 4 is receivable onto a ridge 7 (e.g., FIGS. 10A, 10B, 11A and 11B), the retention member 4 is preferably receivable onto the ridge 7 to a distance not greater than about one-half the radial width of the resilient member 4, so that at least about half of the member 4 protrudes above the top of the ridge 7. However, according to aspects of the present invention, the extent of receipt of the retention member 4 onto the ridge 7 may vary, so long as the retention member is sufficiently and reversibly retainable upon the ridge 7. FIGS. 10B and 11B show blow-up cross-sectional views of exemplary retention member 4 sections to illustrate that. in these elevated seat or 'ridge' embodiments, the inner surfaces of the retention members conform to the respective exemplary retention member seats (rounded and inverted "V"-shaped ridges, respectively). In particular embodiments, the resilient line retention member 4 is elastic or stretchable, and of a size and dimension such that it is stretchably received and retained within the groove 6. In preferred embodiments, the line retention member 4 is annular (e.g., in the form of an o-ring) or equivalent rubber ring, or resilient ring of another elastic material (e.g., plastic, etc.). In particular embodiments, the retention member seat (e.g., groove 6 or ridge 7) is continuous around the exterior surface 14. In alternative embodiments, the retention member seat (e.g., exterior groove 6, or ridge 7) is formed of a plurality of discontinuous seat elements (e.g., repeated finite groove or ridge elements or sections) appropriately disposed around the exterior surface 14 to form a discontinuous seat pattern sufficient to receive and retain the resilient retention member 4. In preferred embodiments (e.g., FIGS. 1, 2, 4, 5A, 5B, 10A, 11A, 12A and 12B) the main body 16 is generally ovoid or ellipsoid, and the retention member seat is a generally elliptical or circular groove 6. However, according to aspects of the present invention, the main body 16, may assume a variety of shapes (e.g., FIGS. 6A-6G). The inventive design allows for essentially any size of main body 16, and the retention member 4 and seat (e.g., 6 or 7) may assume a variety of sizes and widths depending on the desired size of the indicator main body 16. While essentially any main body size could be made, in preferred aspects for most fishing situations, the main body 16 length or diameter is from about 0.6 cm to about 7.6 cm (e.g., ¼ to about 3 inches), from about 1.3 cm to about 5.1 cm (e.g., ½ to about 2 inches), from about 0.9 cm to about 3.75 cm (e.g., ⅞ to about 1.5 inches), or from about 2.8 cm to about 0.64 cm (e.g., ⅜ to about 1.25 inches), depending upon the type of application. In such preferred aspects, corresponding retention members 4 are of a dimension to be receivable and retainable within or upon the conforming retention member seats (e.g., 6 or 7) of such preferred main body 16 size ranges (e.g., from about 0.6 cm to about 7.6 cm (e.g., from about ¼ to about 3 inches) in diameter, etc.). Retention member seat (e.g., 6 or 7) dimensions reflect the size and shape of the main body 16 and the retention members 4, and sufficiently conform to the retention members 4, so as to operationally reversibly receive and retain the retention members 4. Such seats (e.g., 6 or 7) can be grooves 6 or slots within the main body bodies 16, or can be elevated surfaces or ridges 7 protruding from the main body surface 14, and preferably conform in dimension to the main bodies 16 and the retention members 4. Preferred widths (e.g., cross-sectional) for retention members 4 are those that conform to that of the retention member seats. In preferred aspects, retention member widths range from about 0.08 cm to about 0.64 cm (e.g., about 1/32 to about ¼ inches), etc. In particular aspects the retention members consist, or are comprised of elastic, stretchable, resilient material. The dimensions and/or elasticity parameters of such resilient retention members are selected to provide suitable line retention strengths for different types of fishing and fishing situations. Commercially available 'O-rings' are a preferred type of resilient retention member 4. However a variety of resilient materials could be used (rubber washers, elastic bands, rubber bands, etc.), or any material or any structure (resilient or not) that could be reversibly seated and unseated to reversibly retain a line 2 thereunder. Preferably, the line-contact surface of the retention members is of a material that grips the line (e.g., rubber, soft plastic, etc.). The retention members 4 may have a variety of cross-sectional shapes (e.g., circular, ovoid, octagonal, square, rectangular, triangular), with the proviso that they are reversibly receivable and retainable into or onto the retention member seat (e.g., 6 or 7). Preferable, the retaining member 4 conforms in shape to the retention member seat (e.g., 6 or 7).

In particular embodiments, the line retention member 4 is selected to have sufficient retentive force when engaged within or upon the line retention member seat (e.g., 6 or 7), so as to effectively provide for a 'non-disengagable' strike indicator (i.e., wherein the line is held sufficient tightly between the retention member and seat so that fish strikes and fish 'hook-ups' do not disengage the retention member 4 and indicator 28. Moreover, such 'fixed' line position embodiments are highly useful for particular types of fishing (where a slidable indicator is not needed), and are nonetheless novel and surprisingly effective by virtue of the instant inventive line retention means.

In additional aspects the strike indicator 28, further comprises a fishing line 2 extending through the main body channel 10, and reversibly attached to the main body 16 at two points along the line 2 by means of the exterior retaining member seat (e.g., groove 6 or ridge 7) and the retention member 4, wherein the strike indicator 28 is disengagable from the line 2 upon application of sufficient tension to the line 2 (across the two attachment points) and is thereafter slidable (e.g., freely slidable) along the line 2. Therefore, in particular embodiments, the strike indicator 28, further comprises a fishing line extending through the main body channel 10, and, after emerging at the two opposing end openings 8, passing therefrom in opposing directions between the retention member 4 and the retention member seat (e.g., passing between the retention member 4 and the external groove 6, or passing between the retention member 4 and the external ridge 7), wherein the strike indicator 28 is thereby reversibly attached at two points along the line 2. The strike indicator 28 is disengagable from the line 2 upon application of sufficient tension to the line 2 (to disengage the retention member 4 from the retention member seat) and is thereafter slidable along the line 2 (see FIGS. 5A and 5B).

Figure 1:
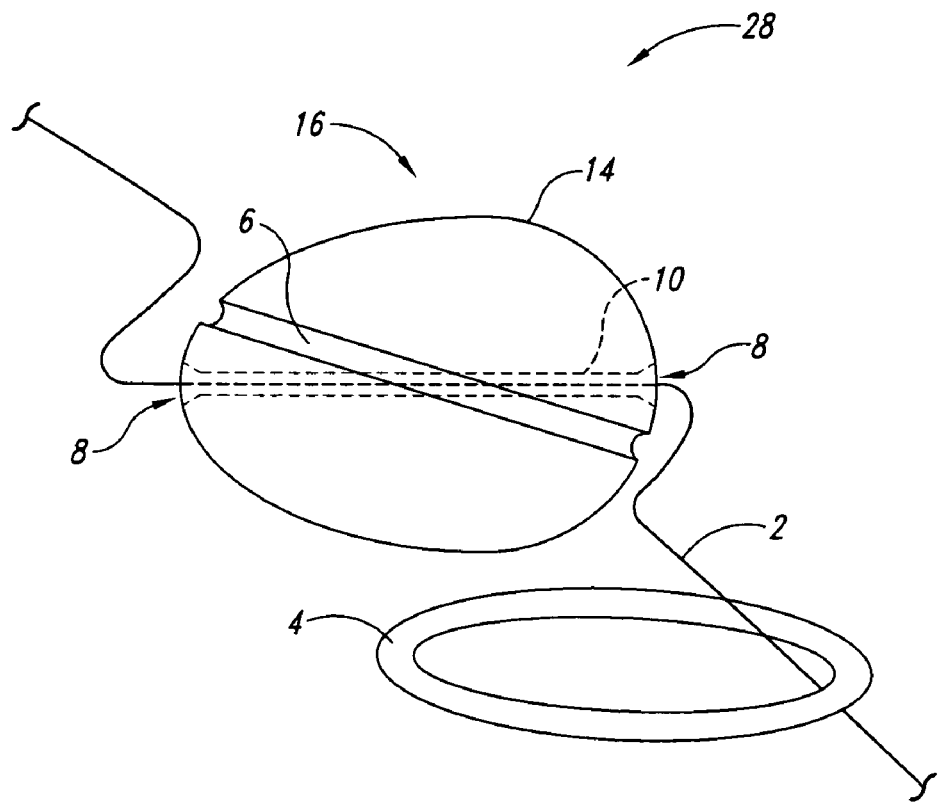
FIG. 1 shows, according to particular aspects of the present invention, a side view of an exemplary disengagable strike indicator embodiment having an axial channel from end to end, an exterior groove within and around the exterior surface that encompasses the channel axis such that channel end openings are disposed on opposite sides of the groove, along with a resilient annular line retention member operative to retain a fishing line passing thereunder at two points within the groove.
Figure 2:
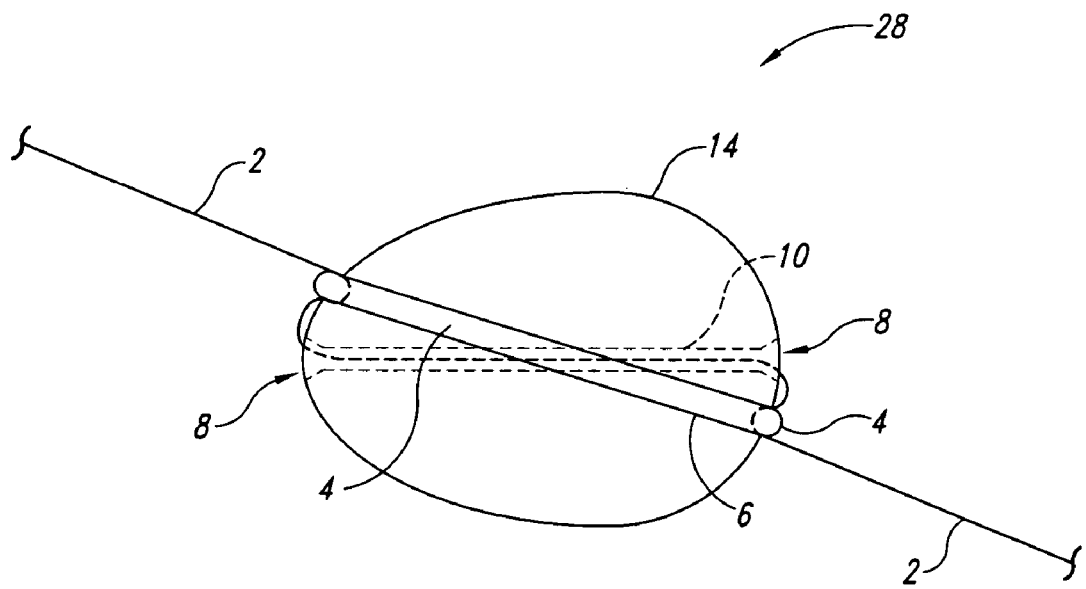
FIG. 2 shows the exemplary disengagable strike indicator embodiment of FIG. 1, wherein the resilient annular line retention member is seated in the exterior groove to retain a fishing line passing thereunder at two points within the groove.

FIG. 2 shows the exemplary disengagable strike indicator embodiment 28 of FIG. 1, wherein the resilient annular line retention member 4 is seated in the exterior groove 6 to retain an exemplary fishing line 2 passing therebetween at two points within the groove 6 (e.g., opposite the respective channel end openings 8). In particular embodiments, the resilient retention member 4 is preferentially displaced onto the line on the larger aspect side of the main body 16 (e.g., on the side of the larger aspect of the ovoid main body 16 as in shown in FIGS. 1, 5B, 10A, 11A), which facilitates retention of the line retention member 4 on the hook-distal side of the strike indicator 28 after disengagement thereof from the line 2. Alternately, the resilient retention member 4 is displaceable on the side of the smaller or opposite aspect of the main body 16. According to particular aspects, the shape of the indicator main body 16 and the disposition of the retention member seat (e.g., 6 or 7) thereto, can be selected to facilitate displacement of the line retention member to one side or another of the indicator main body upon disengagement (see e.g., FIGS. 1, 5B, 10A, 11A and 6B). In either case, the line retention member 4 is retained around the line 2, and thus operationally retrievable for reuse.

Disengagable Strike Indicator System:

With reference to FIGS. 3, 4, 5A, 5B, 7, 12A and 12B, additional aspects provide a disengagable strike indicator system for a fishing line 2 and/or leader or tippet, comprising in addition to the elements and variations of the novel disengagable strike indicator described above, at least one line stop member 18 attachable (e.g., by crimping, adhering, elastic tension, etc.) at a user-selectable fixed position to a fishing line 2 and/or leader or tippet, the line stop member 18 having an outer surface, first and second stop member ends, and an axial stop member channel therebetween, with corresponding first and second stop member end surface openings, wherein the line stop member 18 is receivable into the axial channel 10 of the main body 16, and wherein an aspect of the shape and/or dimension (e.g., flange, or enlarged or extended aspect, etc.) of the line stop member 18 is operative to engage the line stop member 18 when received into the main body channel 10, and is thereby sufficient to preclude travel of a disengaged strike indicator beyond a user-selected fixed position where it engages the stop member 18. Such stop members 18 can be of any suitable material (e.g., metal, plastic, elastic material, etc.), and are dimensionally configured so as to be readily passable, upon line retrieval, through line guides of a fishing rod. Preferably, the outer surfaces of such stop members 18 are non-gripping to facilitate separation from the indicator main body channel 10 upon disengagement of the strike indicator 28 from the line 2, and to facilitate unfettered passage through the line guides upon line retrieval past the user-selected position of stop member 18 attachment.

In this embodiment (e.g., FIG. 4), an inventive strike indicator 28 is shown attached to the line 2 at a point where it is engaged with a stop member 18, which has been attached to line 2 at a user-selected position. In particular embodiments, the distance between the stop member 18 ends is less than one-half the distance between the main body ends 8. In additional preferred embodiments, the disengagable strike indicator system comprises two line stop members 18 receivable at opposite ends of the main body 16. Therefore, additional embodiments provide a disengagable strike indicator system (having at least one stop member 18), further comprising a fishing line 2 extending through the main body channel 10 and reversibly attached to the main body at two points along the line 2 by means of the exterior retention member seat (e.g., groove 6) and retention member 4, wherein the strike indicator is disengagable from the line 2 upon application of sufficient tension to the line 2, and is thereafter slidable from or to the attachment position of the at least one line stop member 18. Therefore, in particular embodiments, the strike indicator 28, comprises a fishing line 2 extending through the main body channel 10 and, after emerging at the two opposing main body channel end openings 8, passing therefrom in opposing directions under the retention member 4 within the external seat (e.g., groove 6), wherein the strike indicator is thereby reversibly attached at two points along the line 2, disengagable from the line 2 upon application of sufficient tension to the line 2, and is thereafter slidable to or from the user-selected attachment position of the at least one line stop member 18.

Figure 3A:
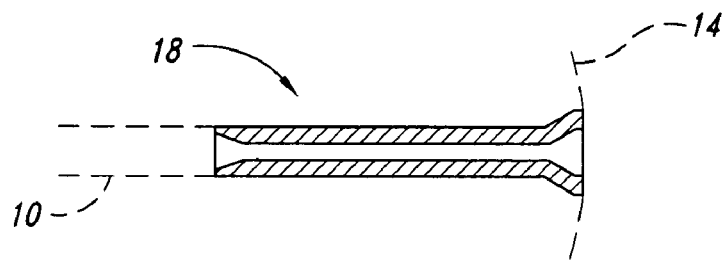
FIGS. 3A-3C shows, according to particular aspects, side views of three exemplary line stop member embodiments that are attachable to a fishing line at user-selectable positions. The inventive line stop members are receivable into the axial channel of the main body of the inventive disengagable strike indicators to provide for a disengagable strike indicator system, and wherein the shape and/or dimension of the line stop members is operative to engage the line stop member within the main body channel of the inventive strike indicators to limit slidable travel of the disengaged strike indicator along a fishing line. The line stop members, when engaged by the indictor main body, may be flush, recessed, or protruding from the main body surface.
Figure 3B:
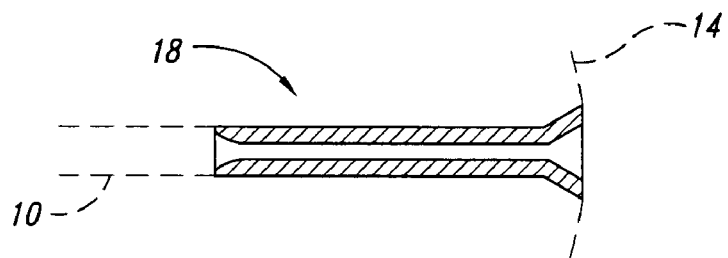
Figure 3C:
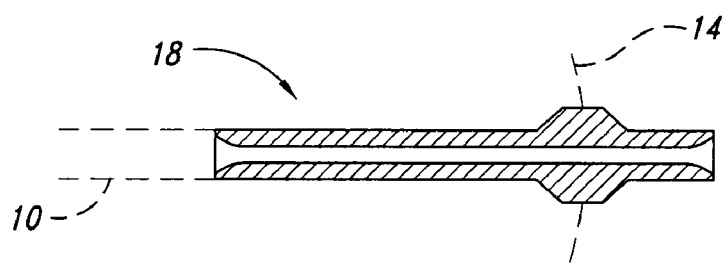

FIGS. 3A. 3B and 3C show side views of three exemplary line stop members 18 attachable to a fishing line 2 at a user-selectable position. The inventive line stop member(s) 18 are receivable into the axial channel 10 of the main body of the inventive disengagable strike indicators (partially shown as dashed lines 14 in the figure) to provide for a disengagable strike indicator system, and the shape and/or dimension of the line stop members 18 is operative to engage the line stop member 18 within the main body channel 10 of the inventive strike indicators to limit slidable travel of the disengaged strike indicator along a fishing line 2. The engagement aspect of the stop member may, for example, correspond to an enlarged portion thereof (e.g., flange, bulge, etc.) that engages a conforming stop member receiving surface of the axial channel 10 (see FIGS. 3A-3C). The line stop members can be of any material that is fixable to the line 2 (e.g., a ductile material that can be pressed or crimped to be retainable at a fixed point on a line 2 and/or leader or tippet, an elastic member that attaches by means of its inherent dimensional character and elasticity, etc.). Affixing the line stop member to the line may be by any suitable means including but non limited to, crimping of a stop member comprising a ductile material (e.g., metal, plastic, etc.), adhering a stop member to the line, affixing by inherent elastic means, etc., as long as the stop member is attached to the line in a fixed or effectively fixed, non-slidable (or at least substantially non-slidable) manner, so that the attached stop members serves to effectively preclude slidable travel of the disengaged strike indicator beyond the stop member attachment position. Stop members, may comprise on the inner surface thereof. Encompassed within the scope of the present invention are those stop members that are attached to a line in a manner sufficient, in practical terms depending on the type and nature of the operational fishing, to substantially preclude slidable movement, but nonetheless are positionable along the line with sufficient applied force if repositioning is desired (e.g., tight fitting elastic members for example). Preferably, the stop members are of a ductile metal, and have a non-gripping exterior surface so as not to preclude travel through line guides.

Figure 4:
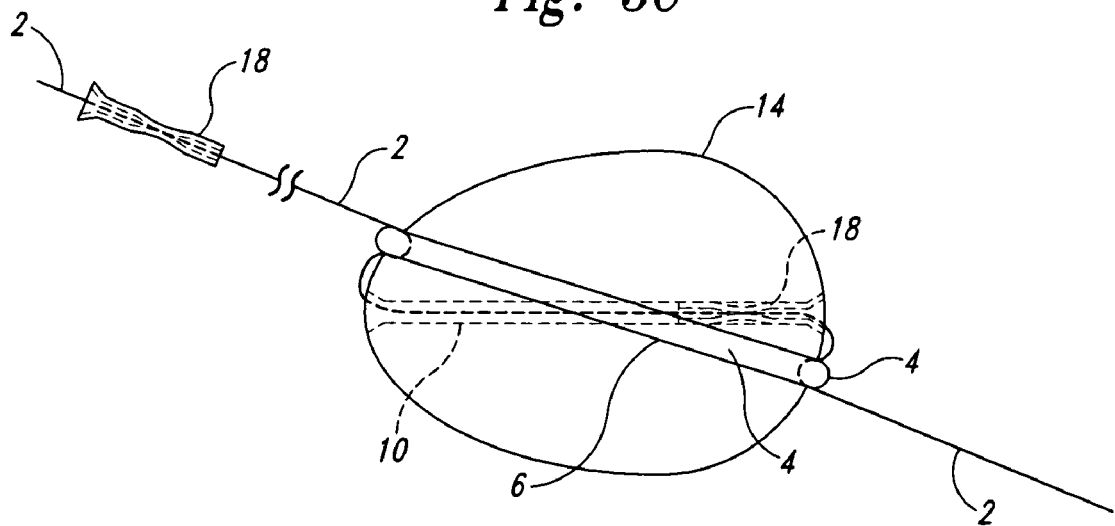
FIG. 4 shows, according to particular aspects, a side view of an exemplary disengagable strike indicator system embodiment having a line stop member engaged therein, and a line stop member located at a remote distance along the line, the two stop members defining a user-selectable range of slidable travel.
Figure 6A:
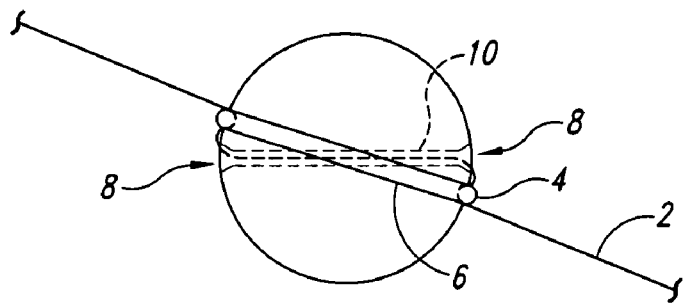
FIGS. 6A-6G show, according to particular aspects, side views of seven additional exemplary disengagable strike indicator embodiments to illustrate that the shape and size of the indicator main body, and the inventive system generally, can assume many different variations.
Figure 6B:
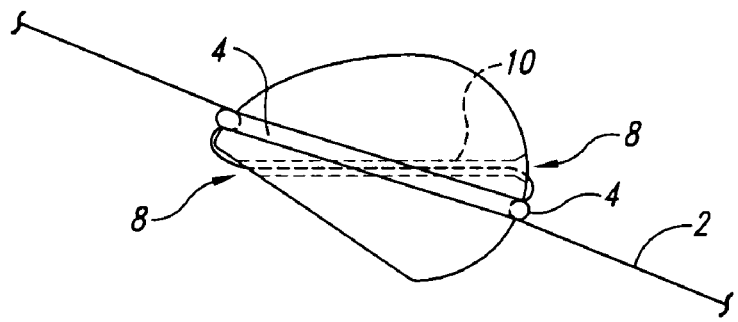
Figure 6C:
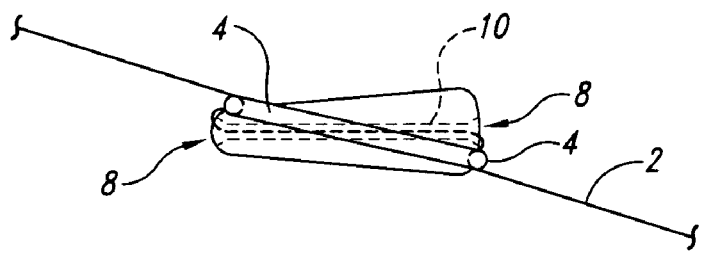
Figure 6D:
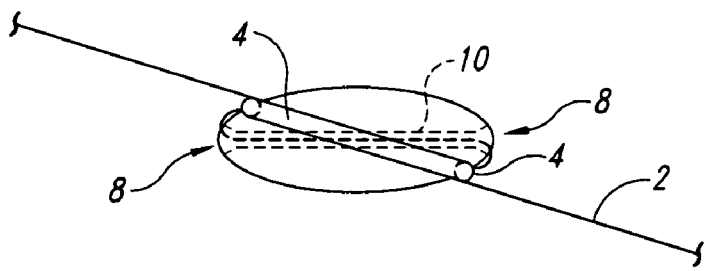
Figure 6E:
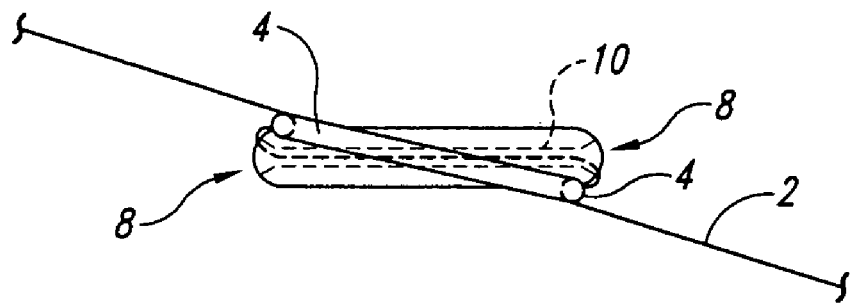
Figure 6F:
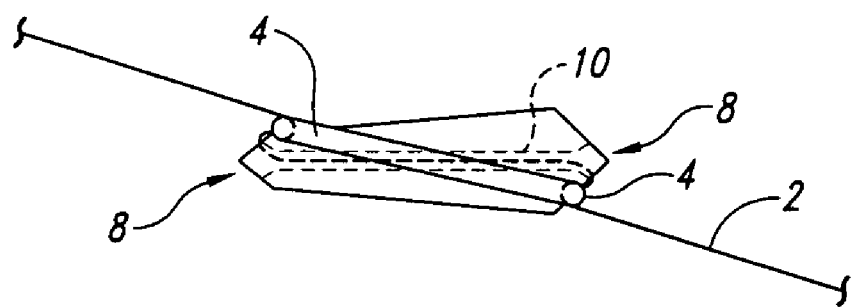
Figure 6G:
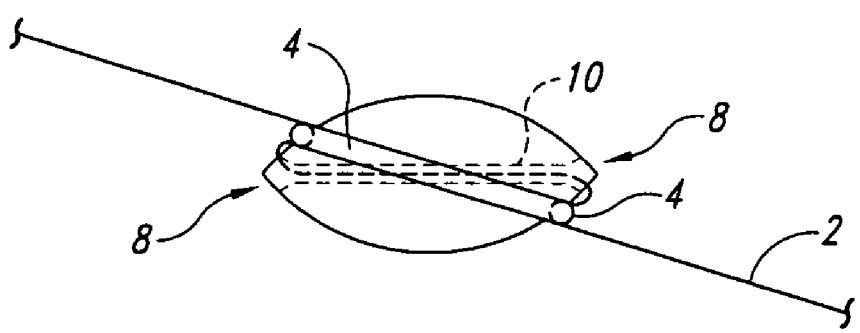
Figure 7:
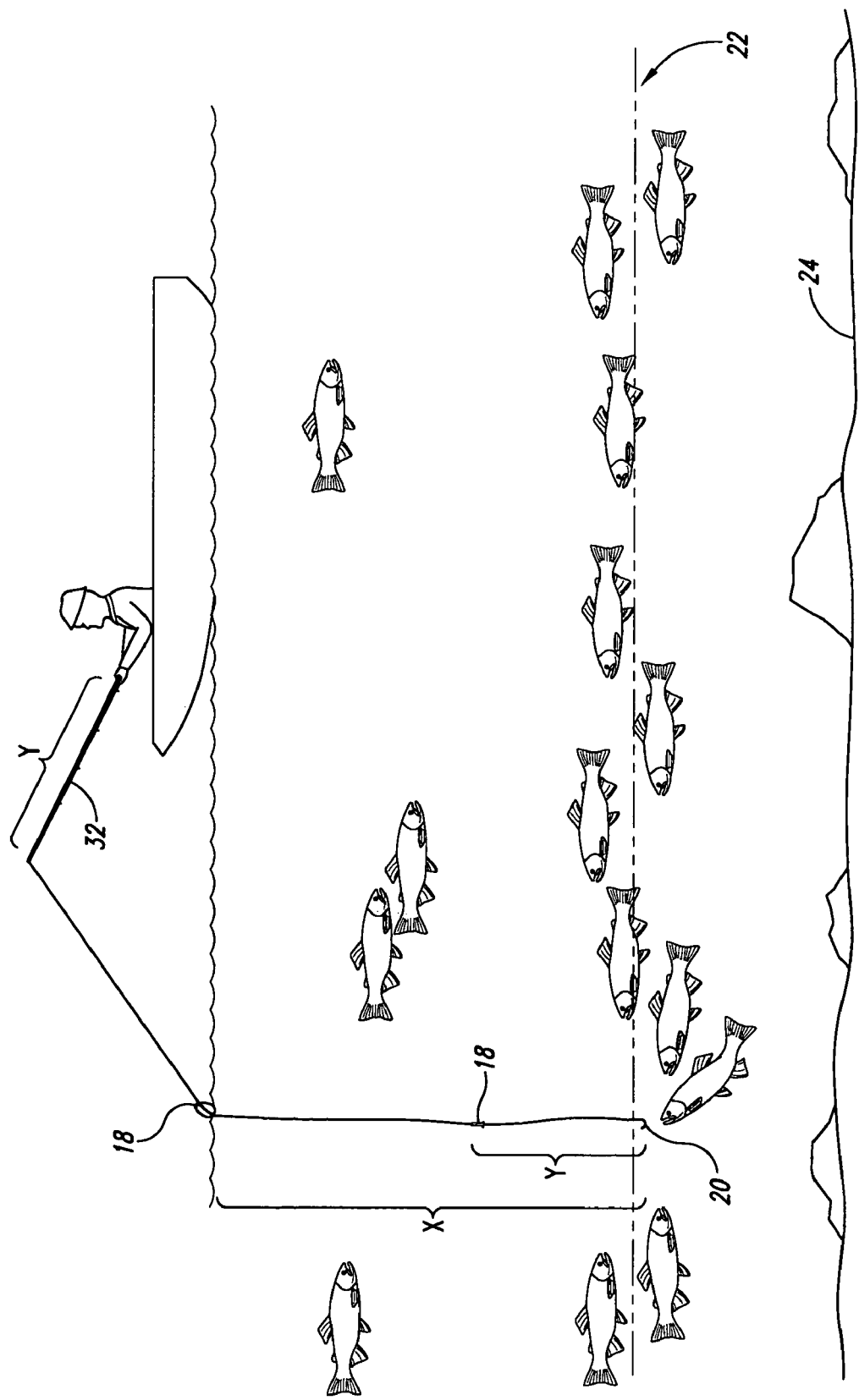
FIG. 7 shows, according to particular aspects, an illustration of an inventive method for fishing with a disengagable and slidable strike indicator at a depth (e.g., 'concentration feeding zone,' or 'holding zone' depth) greater than the length of a fishing rod. The method comprises use of an inventive disengagable strike indicator system, and not only facilitates effective fishing at a consistent user-selected depth, but also facilitates effective and efficient capture of a hooked fish, which in turn enhances the overall fishing experience, and reduces injury to captured fish.
Figure 8A:
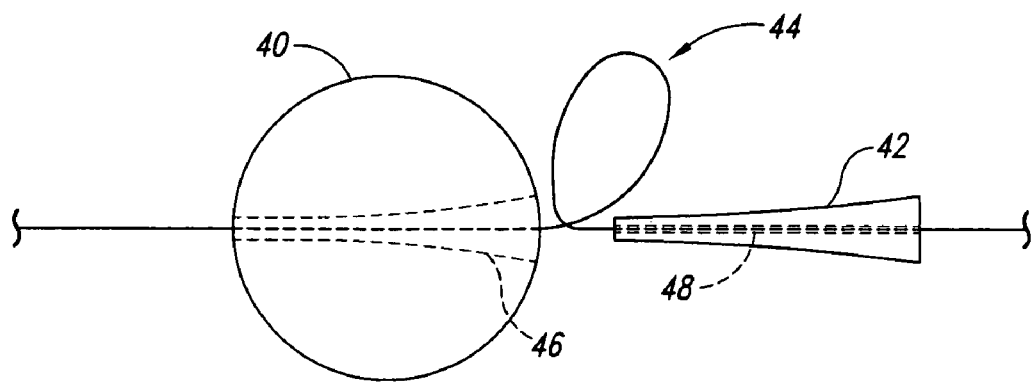
FIGS. 8A and 8B show a prior art quick release strike indicator. With a fish 'hook-up,' tension in the line frees a tippet loop that is wedged between a rubber stopper and the wall of a stopper receiving slot in the indicator body, thereafter allowing the indicator and stopper to freely slide along the fishing line. This indicator, and the substantial drawbacks thereof, are discussed herein above under "Background."
Figure 8B:
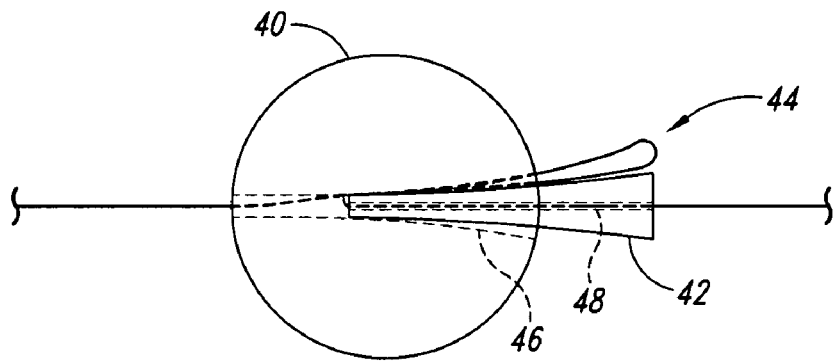
Figure 9:
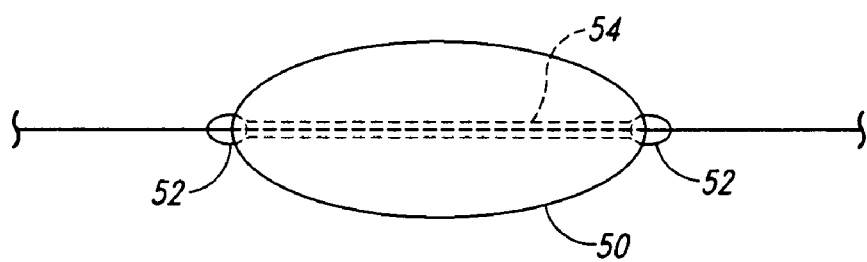
FIG. 9 shows a prior art slidable strike indicator. Elastic positioning retainers enable the indicator to be manually and forcibly repositioned along the leader, while providing sufficient gripping pressure against the leader to maintain its position. This indicator, and the substantial drawbacks thereof, are discussed herein above under "Background."

FIG. 4 shows a side view of an exemplary disengagable strike indicator system embodiment having a line stop member 18 engaged therein, so that in operation the strike indicator is engaged at a user-selected position along the line and/or leader or tippet. FIGS. 5A and 5B show a side view of an exemplary disengagable strike indicator system embodiment having a line stop member 18 engaged therein, and further shows (in going from FIG. 5A to 5B) how the annular line retention member 4 is displaceable from the retention member seat (e.g., exterior groove 6) of the main body 16 upon application of sufficient line tension, which in turn disengages the strike indicator, thereafter allowing sliding of the disengaged strike indicator along the line 2. Typically, in such embodiments, the retention member is displaced on the larger aspect side of the main body (e.g., ovoid), but alternatively, displacement can be on the opposing side of the strike indicator. According to particular aspects, the shape of the indicator main body 16 and the disposition of the retention member seat (e.g., 6 or 7) thereto, can be selected to facilitate displacement of the line retention member to one side or another of the indicator main body upon disengagement (see e.g., FIGS. 1, 4, 5B, 10A, 11A and 6B). In either case, the line retention member 4 is retained around the line 2, and thus operationally retrievable for reuse in the novel disengaging strike indicator system. Significantly, because of the nature of the design, the present strike indicators and systems allow for consistent and reproducible disengagement (e.g., repeatedly disengagable at the same, or substantially the same line tension value) and reuse in the absence of significant wear, degradation, deformation, etc., of the attachment surfaces and of the line surfaces. Moreover, the inventive strike indicators and systems may be selected to disengage at variety of line tension values, depending upon the conformation, dimension and properties (e.g., size, elastic strength (i.e., tensile elastic modulus), etc.) of the line retention members 4, conformation and dimension of the line retention member seats, and the relational disposition of these aspects with respect to each other and with respect to other aspects of the strike indicator (e.g., relative orientation to axial channel 10; orientation with respect to particular conformational aspects (e.g., asymmetric shape aspects; see, e.g., FIG. 6B) of the main body 16, etc.).

In particular embodiments, the disengagable strike indicator system comprises a first and a second line stop member 18, and further comprises a fishing line 2 (or leader and/or tippet) extending through the main body channel 10 and through a channel of the first stop member 18 engaged therein, the line 2 being reversibly attached to the main body 16 at two points along the line 2 by means of the line retention member seat (e.g., exterior groove 6, raised ridge 7, etc.) and retention member 4, wherein the strike indicator is disengagable from the line 2 upon application of sufficient tension to the line 2 (e.g., tensional stress along the line crossing the two attachment positions) and is thereafter slidable (e.g., from a position of engagement with the first stop member, to the engagement and attachment position of the second line stop member 18 that is positioned along the line a user selectable distance from the position of the first attached strike indicator, and on the side of the strike indicator that is opposite that of the first engaged line stop member 18). Therefore, in particular embodiments, the strike indicator 28, comprises a first and a second line stop member 18, further comprises a fishing line 2 extending through the main body channel 10 and through a channel of the first line stop member 18 engaged therein, and the line 2, after emerging at the two opposing main body channel end openings 8, passing therefrom in opposing directions under the retention member 4 seated on the retention member seat (e.g., the external groove 6, raised ridge 7, etc.), wherein the strike indicator is thereby reversibly attached (e.g., restrained) at two points along the line 2, disengagable from the line 2 upon application of sufficient tension to the line 2 (across the two line restraining positions) and is thereafter slidable to the attachment position of the second line stop member 18 positioned along the line 2 a distance from the attached strike indicator, and on the side of the strike indicator that is opposite that of the first engaged line stop member.

The inventive novel system comprises at least one stop member 18, and is not limited to any particular disengagable strike indicator design, provided that it is freely slidable on the line 2 once disengaged therefrom. Therefore, general aspects provide a disengagable strike indicator system for a fishing line, comprising: a fishing line 2; a buoyant disengagable strike indicator that is reversibly attachable to, disengagable from and thereafter slidable along a fishing line 2; and at least one strike indicator stop member 18 attachable to a user-selectable position along the fishing line 2, and sufficient, in operation, to limit slidable travel of the disengaged strike indicator along the fishing line 2. Particular general aspects comprise first and second attachable strike indicator stop members 18 attached at different user-selected positions along the fishing line 2, and suitable, in operation of the system, to delimit a slidable range of the disengaged slidable strike indicator along the fishing line. In particular general aspects, the disengagable strike indicator is attached to the line 2 in engagement with the first line stop member attached at a first user-selected line position, and, upon disengagement, the disengaged strike indicator is thereafter slidable along the fishing line 2 between the first and second line stop members 18. In preferred aspects, the strike indicator is disengagable my means of application of sufficient tension to the fishing line (e.g., upon a fish 'hook-up'). Therefore, general aspects of the present invention provide a method of fishing using a disengagable strike indicator system in combination with at least one strike indicator stop member 18.

With reference to FIGS. 4, 5A, 5B and 7, specific embodiments provide a method of fishing (e.g., essentially any type of fishing in any type of water) with a strike indicator at a set depth X (e.g., corresponding to a 'holding zone' or 'concentration feeding zone' 22) greater than the length Y of a fishing rod, comprising: obtaining a fishing line 2 in operable communication with a fishing rod 32, the line 2 extending through rod line guides and from a tip portion of the fishing rod to a fishing hook 20 and retrievable with line retrieving means mounted on the fishing rod 32, the extended line portion having hook-proximal and hook-distal positions. The method further comprises attaching, to the extended line portion, a first and a second strike indicator stop member 18 at a first, hook-distal line stop position corresponding to a desired fishing depth X, and a second, hook-proximal line stop position corresponding to a position of length Y from the hook, and equal to about the length Y of the fishing rod, respectively, wherein the line stop members 18 are receivable into a buoyant disengagable strike indicator 28, and wherein the shape and/or dimensional aspect of the line stop members 18 is operative to engage the line stop member 18 within the buoyant disengagable strike indicator 28. The method additionally comprises attaching, between the two line stop members 18, to the line 2 and in engagement with the first hook-distal stop member 18, a buoyant disengagable fishing line strike indicator 28 reversibly attached to, disengagable from and thereafter slidable along the fishing line 2 between first and second stop members 18, the strike indicator 28 disengagable by application of sufficient line tension. The method further comprises: disengaging the strike indicator 28 by setting the hook into a fish (e.g., a fish 'hook-up'); and retrieving the extended line to a line position corresponding to about that of the second stop member 18, wherein fishing at a depth X greater than the length Y of a fishing rod and yet reaching the hooked fish for effective and efficient retrieval is afforded.

The invention claimed is:

1. A reversibly disengagable strike indicator, comprising:
a buoyant main body portion having an exterior surface, first and second main body ends, and an axial closed-walled channel therebetween, the channel having a first end opening at the first main body end and a second end opening at the second main body end, the channel, sufficient, in operation, to allow slidable passage of a fishing line therethrough without permitting the line to separate from the main body;
a line retention member seat disposed around the main body surface, the line retention member seat disposed at a non-zero angle with respect to the axial channel; and
a line retention member reversibly receivable and retainable by the seat, and operative with the seat to grip and retain a fishing line therebetween at two points, the two points spaced apart from the end openings and opposing each other along the exterior surface of the main body, wherein, in operation with a line, the line retention member is displaceable from the seat and the main body upon application of sufficient line tension, thereby, disengaging the strike indicator, and wherein the main body is configured to be slidable on the line, unimpeded by the line retention member, upon displacement of the line retention member.

2. The strike indicator of claim 1, wherein the line retention member seat encompasses the channel axis such that the first and second end openings are disposed on opposite sides of the seat.

3. The strike indicator of claim 2, wherein the line retention member seat is a continuous or discontinuous groove.

4. The strike indicator of claim 2, wherein the line retention member seat is a continuous or discontinuous raised ridge protruding at least to some extent from the main body surface.

5. The strike indicator of claim 1, wherein the main body channel axis intersects a plane defined by the retention member seat at an angle less than ninety degrees.

6. The strike indicator of claim 1, wherein the angle between the main body channel axis at the first or second main body end, and a plane defined by the retention member seat is selected from the group consisting of: less than about thirty degrees and greater than about 2 degrees; less than about twenty degrees and greater than about five degrees; and less than about fifteen degrees and greater than about seven degrees.

7. The strike indicator of claim 1, wherein the nearest distance, in opposite directions, from the first and second main body end openings to the retention member seat is the same or substantially the same.

8. The strike indicator of claim 1, wherein the line retention member protrudes, at least to some extent, from the seat.

9. The strike indicator of claim 1, wherein the line retention member is receivable by the retention seat to a distance not greater than about one-half the radial width of the retention member.

10. The strike indicator of claim 1, wherein the line retention member is under tensile elastic stress while being retained by the retention member seat.

11. The strike indicator of claim 10, wherein the line retention member is in the form of an annular elastic band or an 'o-ring'.

12. The strike indicator of claim 1, wherein the retention member seat is continuous around the surface of the main body.

13. The strike indicator of claim 1, wherein the main body is generally ovoid or ellipsoid, and wherein the retention member seat is generally elliptical or circular.

14. The strike indicator of claim 1, further comprising a fishing line, leader or tippet portion extending through the main body channel, and reversibly attached to the main body at two points along the line by means of the retention member seat and retention member, wherein the retention member is, in operation, displaceable from the seat upon application of sufficient tension to the line, thereby disengaging the main body to be slidable along the line.

15. The strike indicator of claim 2, further comprising a fishing line, leader or tippet portion extending through the main body channel, and, after emerging at the two opposing end openings, passing therefrom in opposing directions between the retention member and the retention member seat, wherein the strike indicator is thereby reversibly retained at two points along the line, and wherein, in operation, the retention member is disengagable from the seat upon application of sufficient line tension, thereby disengaging the main body to be slidable along the line.

16. A reversibly disengagable strike indicator system, comprising:
a buoyant main body portion having an exterior surface, first and second main body ends, and an axial closed-walled channel therebetween, the channel having a first end opening at the first main body end and a second end opening at the second main body end, the channel sufficient, in operation, to allow slidable passage of a fishing line therethrough without permitting the line to separate from the main body;
an exterior retention member seat disposed around the main body surface, the line retention member seat disposed at a non-zero angle with respect to the axial channel;
a line retention member reversibly receivable and retainable by the seat, and operative with the seat to grip and retain a fishing line passing therebetween at two points, the two points spaced apart from the end openings and opposing each other along the exterior surface of the main body, wherein the main body is configured to be slidable on the line, unimpeded by the line retention member, upon displacement of the line retention member from the seat and the main body; and
at least one line stop member attachable to a fishing line, the line stop member having an outer surface, first and second stop member ends, and an axial stop member channel therebetween, with corresponding first and second stop member end openings, wherein the line stop member is reversibly receivable and engagable into the axial channel of the main body.

17. The strike indicator system of claim 16, wherein the line retention member seat encompasses the channel axis such that the first and second end openings are disposed on opposite sides of the seat.

18. The strike indicator system of claim 17, wherein the line retention member seat is a continuous or discontinuous groove.

19. The strike indicator system of claim 17, wherein the line retention member seat is a continuous or discontinuous raised ridge protruding at least to some extent from the main body surface.

20. The strike indicator system of claim 16, wherein the distance between the stop member ends is less that about one-half the distance between the main body ends.

21. The strike indicator system of claim 16, comprising two line stop members receivable at opposite ends of the main body.

22. The strike indicator system of claim 16, wherein the main body channel axis intersects a plane defined by the retention member seat at an angle less than ninety degrees.

23. The strike indicator system of claim 16, wherein the angle between the main body channel axis at the first or second main body end, and a plane defined by the retention member seat is selected from the group consisting of: less than about thirty degrees and greater than about 2 degrees; less than about twenty degrees and greater than about five degrees; and less than about fifteen degrees and greater than about seven degrees.

24. The strike indicator system of claim 16, wherein the nearest distance, in opposite directions, from the first and second main body end openings to the retention member seat is the same or substantially the same.

25. The strike indicator system of claim 16, wherein the line retention member protrudes, at least to some extent, from the seat.

26. The strike indicator system of claim 16, wherein the line retention member is receivable by the seat to a distance not greater than about one-half the radial width of the member.

27. The strike indicator system of claim 16, wherein the line retention member is under tensile elastic stress while being retained by the retention member seat.

28. The strike indicator system of claim 27, wherein the line retention member is in the form of an annular elastic band or an 'o-ring.'

29. The strike indicator system of claim 16, wherein the retention member seat is continuous around the surface of the main body.

30. The strike indicator system of claim 16, wherein the main body is generally ovoid or ellipsoid, and wherein the retention member seat is generally elliptical, or circular.

31. The strike indicator system of claim 16, further comprising a fishing line, leader or tippet portion suitable for extending through the main body channel, and reversibly retainable to the main body at two points along the line by means of the retention member seat and retention member, wherein the retention member is, in operation, displaceable from the seat upon application of sufficient tension to the line, thereby disengaging the main body to be slidable upon the fishing line, leader or tippet portion.

32. The strike indicator system of claim 17, further comprising a fishing line, leader or tippet portion, wherein a line stop member is attachable to the fishing line, leader or tippet portion at an attachment position, the line, leader or tippet suitable for extending through the main body channel and, after emerging at the two opposing main body channel end openings, passing therefrom in opposing directions between the retention member and retention member seat, and reversibly retainable to the main body at two points along the line, and wherein, in operation, the retention member is disengagable from the seat upon application of sufficient line tension, thereby disengaging the main body to be slidable to the attachment position of the line stop member.

33. The strike indicator system of claim 16, further comprising a fishing line, leader or tippet portion, and comprising a first and a second line stop member attachable to the fishing line, leader or tippet portion at respective first and second line stop member attachment positions, the line, leader or tippet suitable for extending through the main body channel and reversibly retainable by the main body at two points along the line by means of the line retention member and retention seat, wherein, in operation, the retention member is disengagable from the retention member seat upon application of sufficient line tension, thereby disengaging the main body to be slidable between the first and second line stop member attachment positions of the line.

34. The strike indicator system of claim 17, further comprising a fishing line, leader or tippet portion, and comprising a first and a second line stop member attachable to the fishing line, leader or tippet portion at respective first and second line stop member attachment positions, the line, leader or tippet suitable for extending through the main body channel and, after emerging at the two opposing main body channel end openings, passing therefrom in opposing directions between the line retention member and the retention member seat, reversibly retainable to the main body at two points along the line, wherein the retention member is, in operation, disengagable from the retention member seat upon application of sufficient line tension, thereby disengaging the main body to be slidable between the first and second line stop member attachment positions of the line stop.

* * * * *